(12) United States Patent
Yu

(10) Patent No.: US 9,107,288 B2
(45) Date of Patent: Aug. 11, 2015

(54) ELECTRONIC APPARATUS

(71) Applicant: KABUSHIKI KAISHA TOSHIBA, Minato-Ku, Tokyo (JP)

(72) Inventor: Jingdong Yu, Hanzhong (CN)

(73) Assignee: Kabushiki Kaisha Toshiba, Tokyo (JP)

( * ) Notice: Subject to any disclaimer, the term of this patent is extended or adjusted under 35 U.S.C. 154(b) by 188 days.

(21) Appl. No.: 13/735,197

(22) Filed: Jan. 7, 2013

(65) Prior Publication Data
US 2013/0201642 A1 Aug. 8, 2013

(30) Foreign Application Priority Data
Feb. 2, 2012 (CN) .......................... 2012 1 0022884

(51) Int. Cl.
H05K 5/00 (2006.01)
G06F 1/16 (2006.01)
(52) U.S. Cl.
CPC ............ H05K 5/0017 (2013.01); G06F 1/1601 (2013.01); G06F 1/1656 (2013.01)
(58) Field of Classification Search
USPC ................................ 361/752, 748
See application file for complete search history.

(56) References Cited

U.S. PATENT DOCUMENTS

| 6,583,831 B2 | 6/2003 | Kim |
| 6,914,773 B2 | 7/2005 | Yang et al. |
| 7,046,310 B2 * | 5/2006 | Lee .............................. 348/836 |
| 7,697,281 B2 | 4/2010 | Dabov et al. |
| 7,869,206 B2 | 1/2011 | Dabov et al. |
| 2012/0081874 A1 * | 4/2012 | Wu et al. ...................... 361/807 |

FOREIGN PATENT DOCUMENTS

| CN | 1383059 A | 12/2002 |
| CN | 1230723 C | 12/2005 |
| CN | 201976357 U | 9/2014 |
| KR | 10-0383801 B1 | 5/2003 |

OTHER PUBLICATIONS

The First Office Action mailed by State Intellectual Property Office of the People's Republic of China on Oct. 29, 2014 in the corresponding Chinese patent application No. 201210022884.1—17 pages.

* cited by examiner

*Primary Examiner* — Andargie M Aychillhum
(74) *Attorney, Agent, or Firm* — Knobbe, Martens, Olson & Bear LLP

(57) ABSTRACT

According to one embodiment, an electronic apparatus includes a box shaped housing, a display unit, and a printed circuit board. The housing includes a front casing having an opening and a back casing. The display unit is configured in the housing and exposed from the opening. The printed circuit board is configured in the housing and mounted on the back casing. A power contact is located on a lowest portion of the printed circuit board. a portion of the printed circuit board which is above a topside of a position occupied by the power contact overlaps a corresponding portion of the display unit in a front-back direction.

16 Claims, 11 Drawing Sheets

ELECTRONIC APPARATUS

CROSS-REFERENCE TO RELATED APPLICATIONS

This application is based upon and claims the benefit of priority from Chinese Patent Application No. 201210022884.1, filed Feb. 2, 2012, the entire contents of which are incorporated herein by reference.

FIELD

Embodiments described herein relate generally to electronic apparatuses.

BACKGROUND

At present, there is a requirement for additional display devices to display all kinds of information in more and more cases. However, present desktop displays are not convenient for carrying and using, because they have large volumes and heavy weights and require special adapters and video connecting lines. Regarding this disadvantage, an electronic apparatus which is convenient for carrying and is used to display has been developed. For example, such electronic apparatus may be a mobile display, a mobile LCD monitor, a portable display device and the like.

As for the electronic apparatus which is convenient for carrying and is used to display in present market, in the structure, four rims of a front casing of a housing of the electronic apparatus are caused to be relatively wider due to an arrangement of internal components of the electronic apparatus, thereby a size of a display unit provided in the housing is limited. If the size of the display unit is desired to be increased, a size of the housing must be increased. Thus, a whole size and weight of the electronic apparatus will be increased greatly, so that it is disadvantage for carrying and reducing costs.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

DETAILED DESCRIPTION

Figure 1:
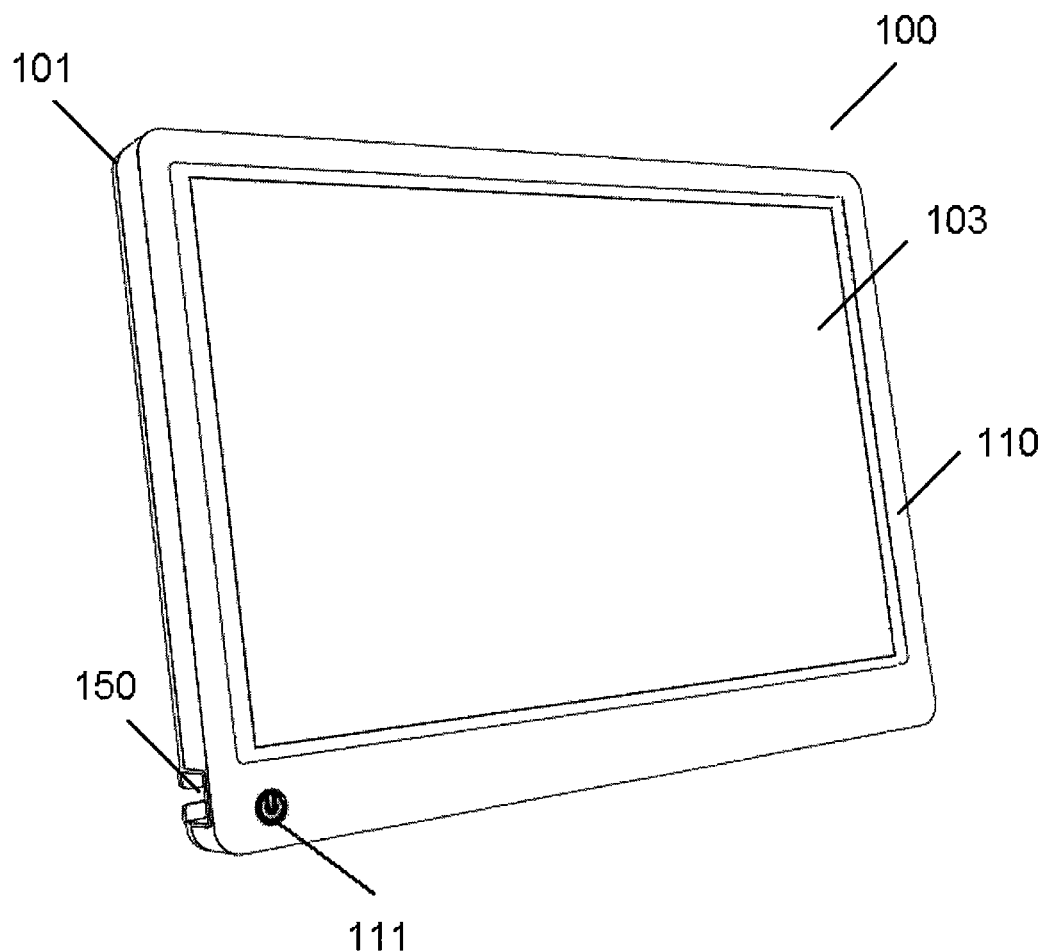
FIG. 1 shows an exemplary perspective view of a mobile LCD monitor according to an embodiment.

Various embodiments will be described hereinafter with reference to the accompanying drawings.

In general, according to one embodiment, there is provided an electronic apparatus, comprising:

a box shaped housing that comprises a front casing having an opening and a back casing;

a display unit that is configured in the housing and exposed from the opening;

a printed circuit board that is configured in the housing and mounted on the back casing, a power contact being located on a lowest portion of the printed circuit board, wherein, a portion of the printed circuit board which is above a topside of a position occupied by the power contact overlaps a corresponding portion of the display unit in a front-back direction.

With the above configuration, the widths of the rim parts of the front casing can be reduced effectively.

Further, the back casing has a box shape opening from one side and comprises an upper side face portion, a lower side face portion, a left side face portion, a right side face portion and a back face portion which are integrated, the upper side face portion, the lower side face portion, the left side face portion and the right side face portion are arc face portions, the back face portion is a plane face portion, and radiuses of curvature of arc faces of the upper side face portion, the left side face portion and the right side face portion are same and are larger than radius of curvature of arc face of the lower side face portion.

With the above configuration, the thickness of a part of the electronic apparatus can be reduced, so that the whole weight of the electronic apparatus becomes lighter and the manufacture cost of the electronic apparatus is reduced. In the meantime, the electronic apparatus has a fine appearance and a good feel.

Further, the electronic apparatus comprises a AC connector, one end of the AC connector being located at a side face of the housing and used for connecting an external power supply, the other end of the AC connector connecting the printed circuit board, wherein the AC connector and the display unit are configured to be side by side in the front-back direction.

With the above configuration, the AC connector will not increase the whole thickness of the electronic apparatus.

Further, the back casing comprises a first protrusion portion that protrudes from an inner side face of the back casing. The first protrusion portion is located behind the power contact in the front-back direction.

With the above configuration, the first protrusion portion can reinforce and protect the printed circuit board where the power contact locates so as to prevent the printed circuit board where the power contact locates from being damaged due to a force produced when a user presses a power button.

Further, the printed circuit board further comprises a display unit connector used for connecting the display unit. The back casing comprises a second protrusion portion that protrudes from an inner side face of the back casing. The second protrusion portion is located behind the display unit in the front-back direction.

With the above configuration, the second protrusion portion can reinforce and protect the printed circuit board where the display unit connector locates so as to prevent the printed circuit where the display unit connector locates from being damaged due to a force produced when the display unit is connected to the display unit connector.

Further, the electronic apparatus further comprises a joint member that is located on an external side face of the back casing and used for securing the electronic apparatus on an external support member.

With the above configuration, the joint member on the electronic apparatus can firmly secure the electronic apparatus on the external support member.

Further, the electronic apparatus further comprises a middle plate that is configured in the housing and located between the display unit and the printed circuit board.

With the above configuration, the middle plate not only can support the display unit to prevent the display unit from being damaged, but also can shield an electromagnetic interference and an electrostatic interference between the display unit and the printed circuit board.

Further, the electronic apparatus is a mobile LCD monitor.

In following embodiments, an example of the electronic apparatus is a mobile LCD monitor 100. However, the embodiment is not limited thereto. For example, the electronic apparatus also can be a mobile display, a portable liquid crystal display, a portable display device and the like.

Figure 2:
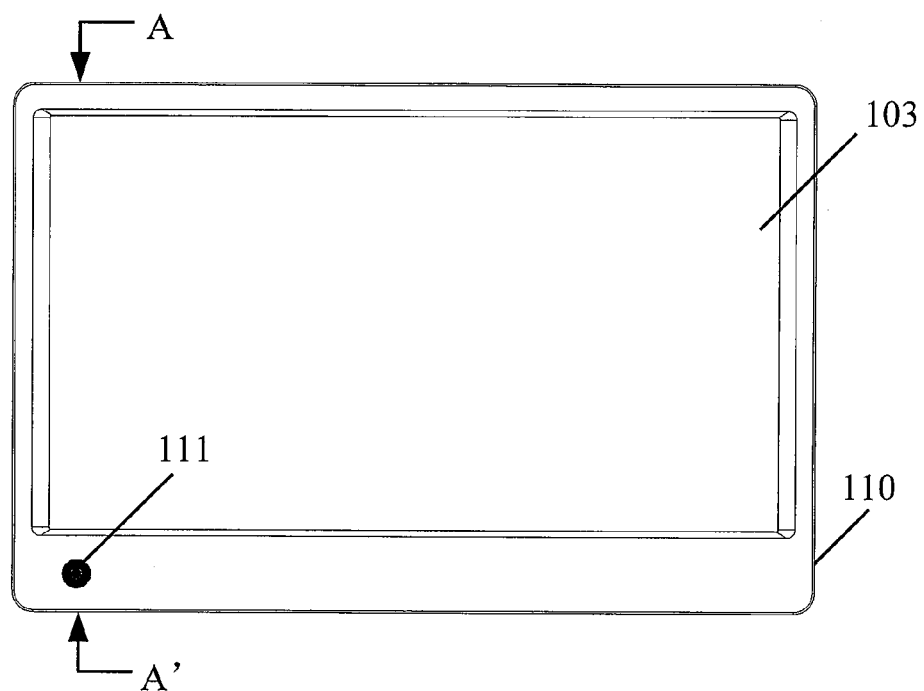
FIG. 2 shows an exemplary front view of an external configuration of the mobile LCD monitor according to the embodiment.
Figure 3:
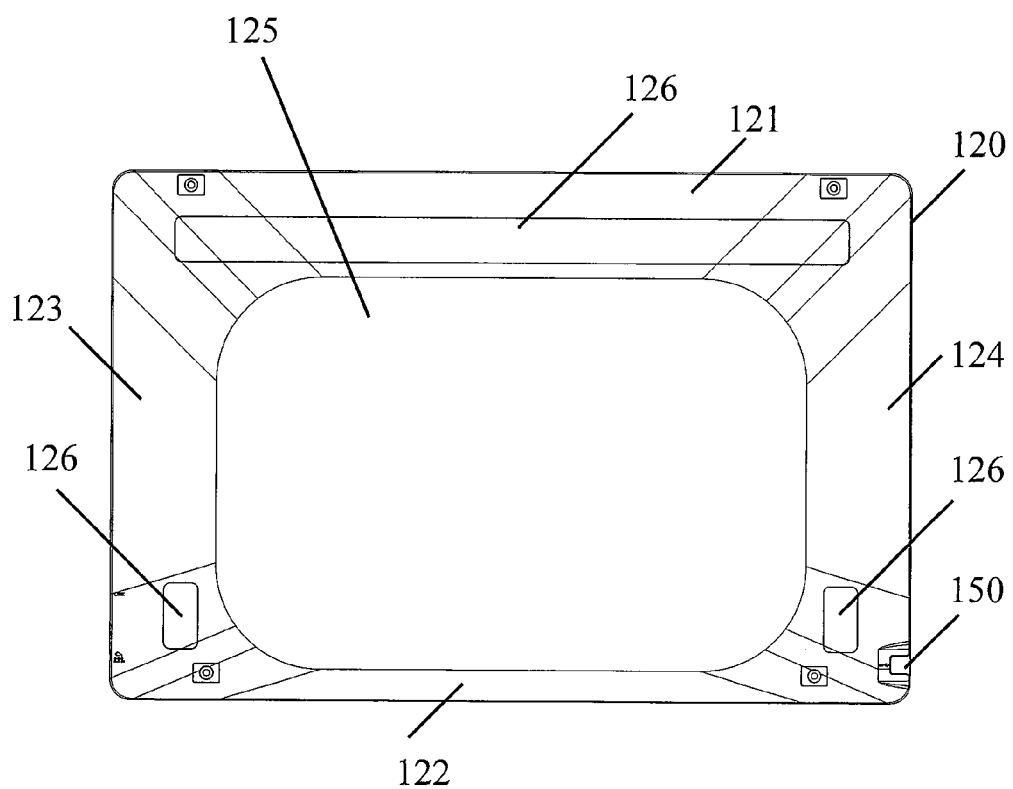
FIG. 3 shows an exemplary back view of an external configuration of the mobile LCD monitor according to the embodiment.
Figure 4:
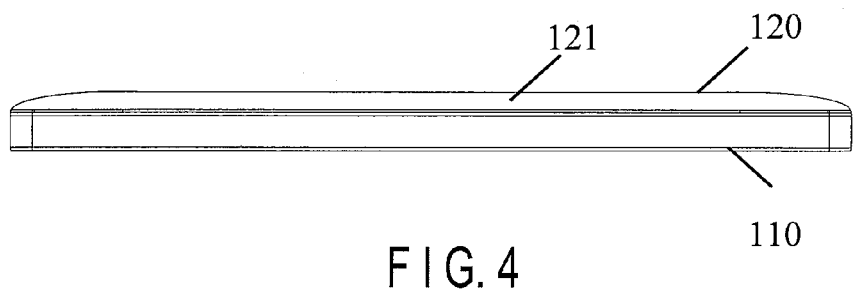
FIG. 4 shows an exemplary top view of an external configuration of the mobile LCD monitor according to the embodiment.
Figure 5:
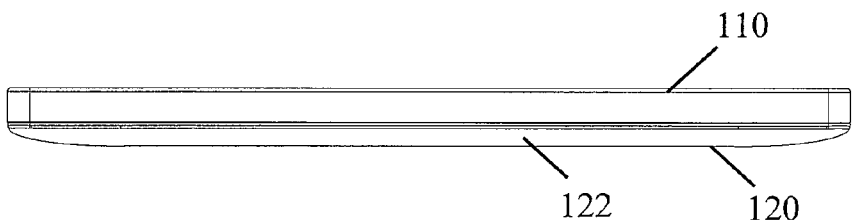
FIG. 5 shows an exemplary bottom view of an external configuration of the mobile LCD monitor according to the embodiment.
Figure 6:
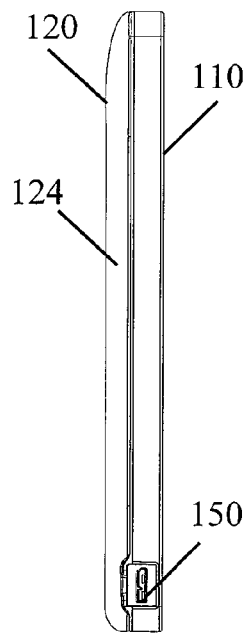
FIG. 6 shows an exemplary left view of an external configuration of the mobile LCD monitor according to the embodiment.
Figure 7:
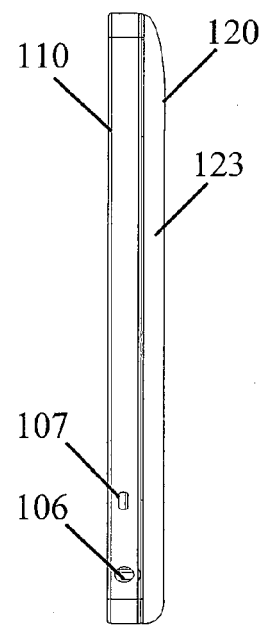
FIG. 7 shows an exemplary right view of an external configuration of the mobile LCD monitor according to the embodiment.
Figure 8:
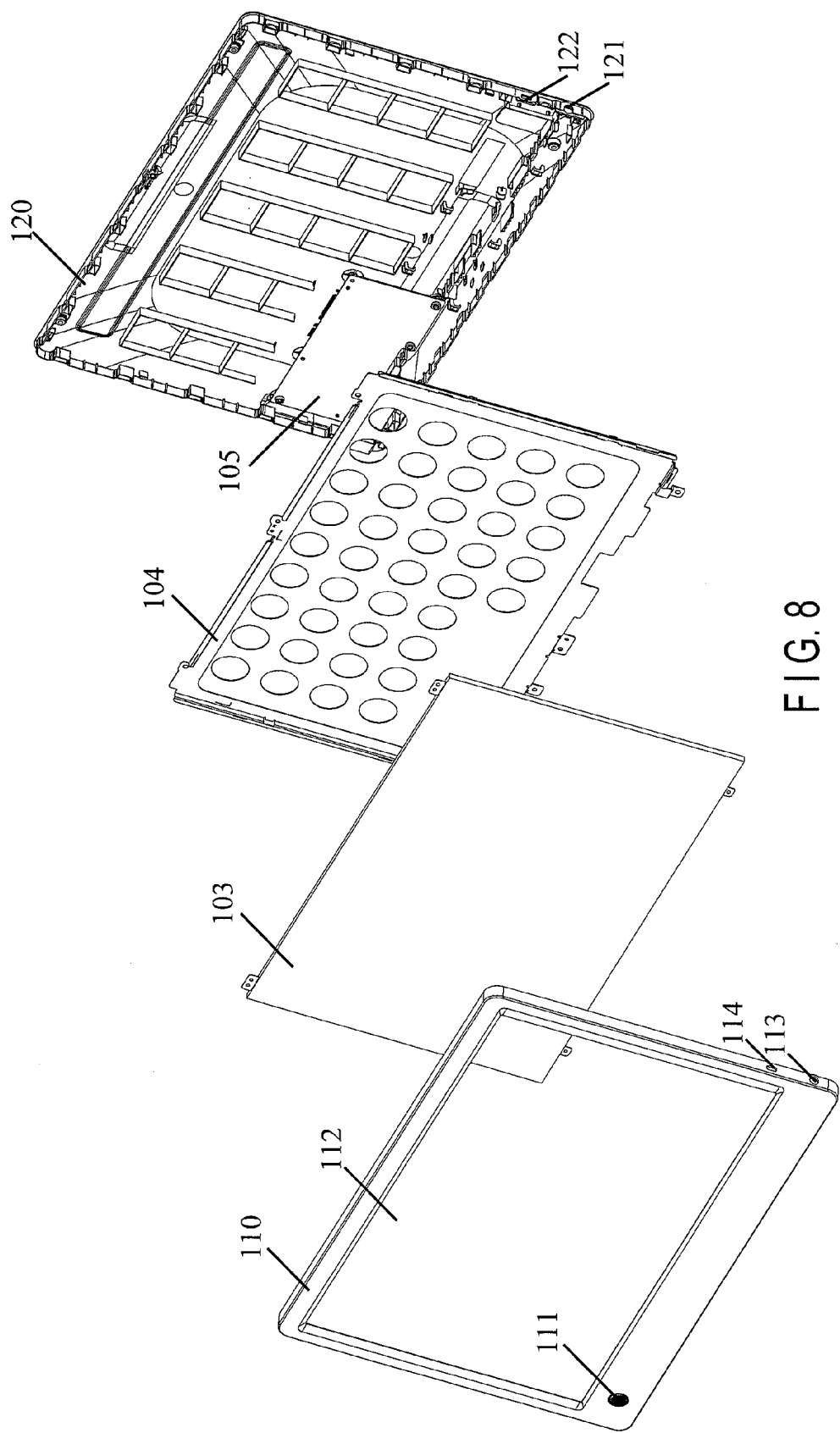
FIG. 8 shows an exemplary exploded view of an internal configuration of the mobile LCD monitor according to the embodiment.
Figure 9:
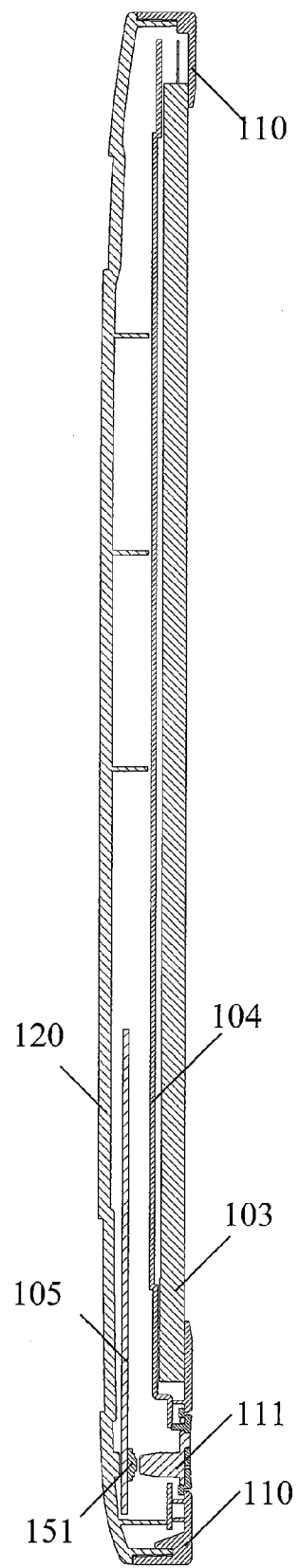
FIG. 9 shows an exemplary sectional view of a configuration of the mobile LCD monitor obtained by cutting along a line AA' in the FIG. 2 according to the embodiment.
Figure 10:
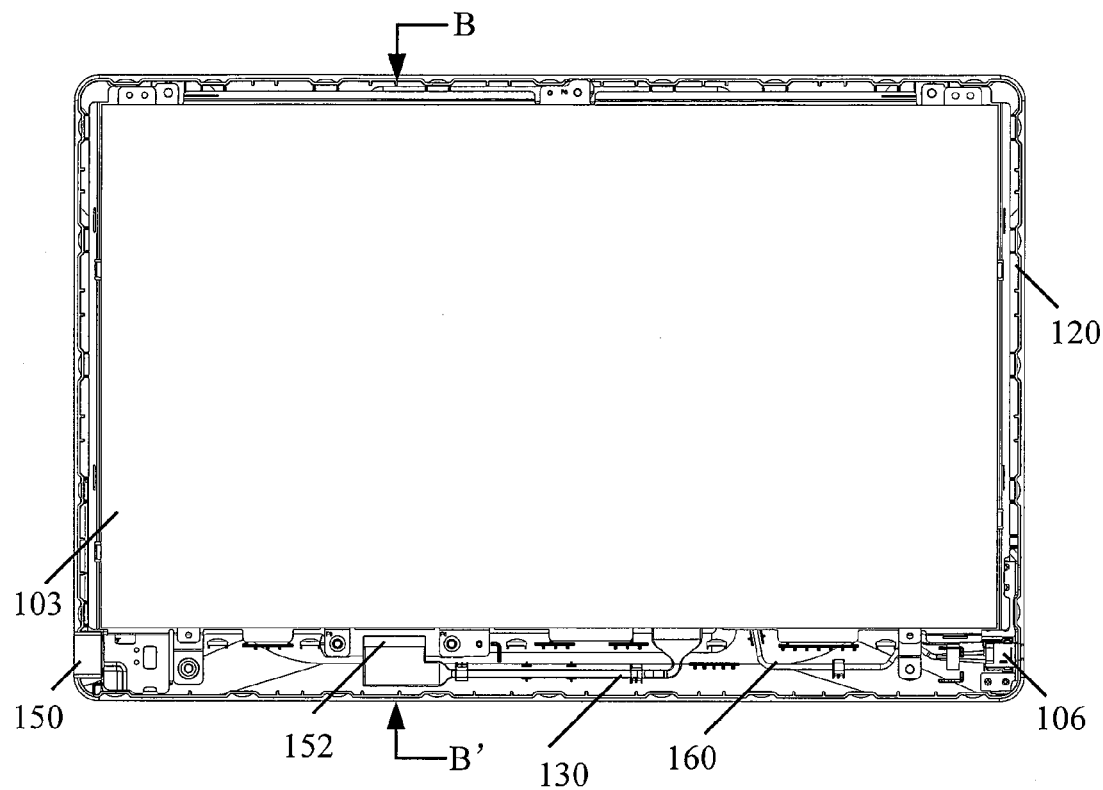
FIG. 10 shows an exemplary view of a configuration of the mobile LCD monitor in which a front casing is removed according to the embodiment.
Figure 11:
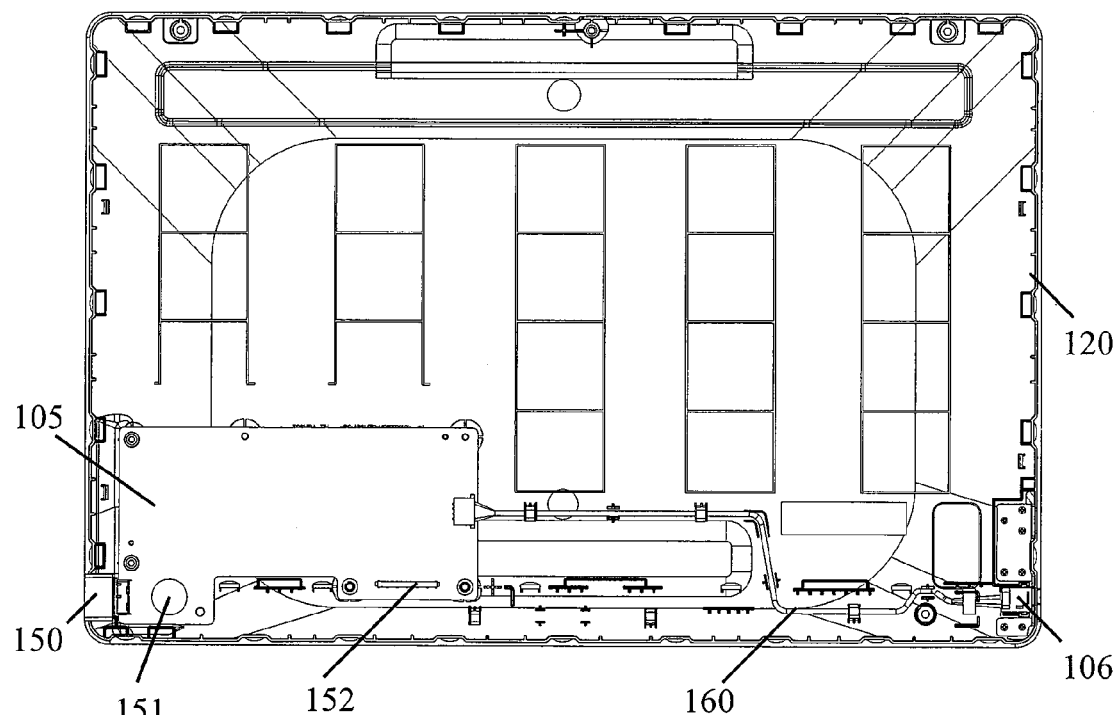
FIG. 11 shows an exemplary view of a configuration of the mobile LCD monitor in which a front casing, a LCD display screen and a middle plate are removed according to the embodiment.
Figure 12:
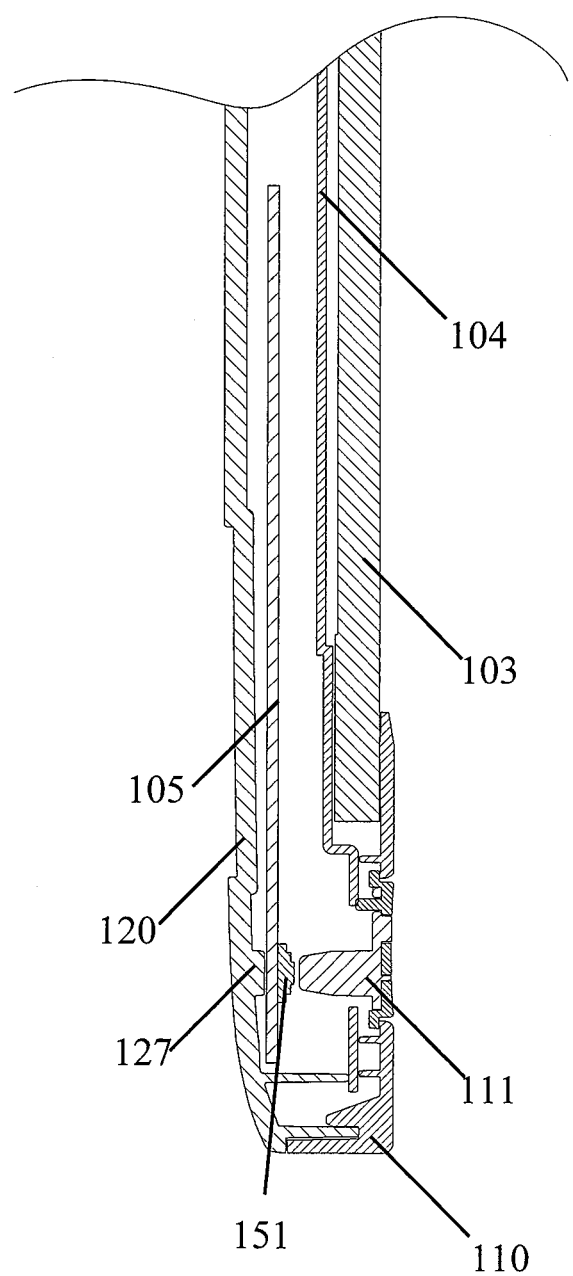
FIG. 12 shows an exemplary partial sectional view of a configuration of the mobile LCD monitor obtained by cutting along a line AA' in the FIG. 2 according to the embodiment.
Figure 13:
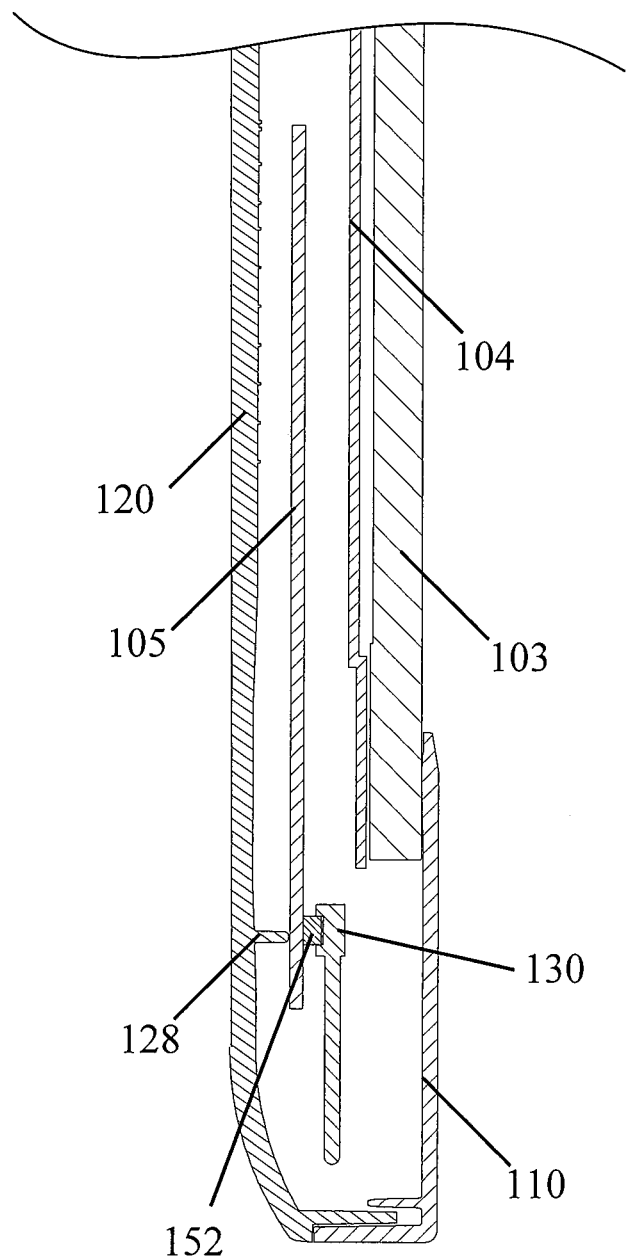
FIG. 13 shows an exemplary partial sectional view of a configuration of the mobile LCD monitor obtained by cutting along a line BB' in the FIG. 10 according to the embodiment.

The configuration of the mobile LCD monitor 100 according to the embodiment is described below with reference to the FIGS. 1 to 13. FIG. 1 shows an exemplary perspective view of the mobile LCD monitor 100 according to the embodiment. FIG. 2 shows an exemplary front view of an external configuration of the mobile LCD monitor 100 according to the embodiment. FIG. 3 shows an exemplary back view of an external configuration of the mobile LCD monitor 100 according to the embodiment. FIG. 4 shows an exemplary top view of an external configuration of the mobile LCD monitor 100 according to the embodiment. FIG. 5 shows an exemplary bottom view of an external configuration of the mobile LCD monitor 100 according to the embodiment. FIG. 6 shows an exemplary left view of an external configuration of the mobile LCD monitor 100 according to the embodiment. FIG. 7 shows an exemplary right view of an external configuration of the mobile LCD monitor 100 according to the embodiment. FIG. 8 shows an exemplary exploded view of an internal configuration of the mobile LCD monitor 100 according to the embodiment. FIG. 9 shows an exemplary sectional view of a configuration of the mobile LCD monitor 100 obtained by cutting along a line AA' in the FIG. 2 according to the embodiment. FIG. 10 shows an exemplary view of a configuration of the mobile LCD monitor 100 in which a front casing is removed according to the embodiment. FIG. 11 shows an exemplary view of a configuration of the mobile LCD monitor 100 in which a front casing, a LCD display screen and a middle plate are removed according to the embodiment. FIG. 12 shows an exemplary partial sectional view of a configuration of the mobile LCD monitor 100 obtained by cutting along a line AA' in the FIG. 2 according to the embodiment. FIG. 13 shows an exemplary partial sectional view of a configuration of the mobile LCD monitor 100 obtained by cutting along a line BB' in the FIG. 10 according to the embodiment.

As shown in the FIGS. 1 to 13, the mobile LCD monitor 100 comprises a box shaped housing 101, a LCD display screen 103 which is a display unit, and a printed circuit board 105. The box shaped housing 101 comprises a front casing 110 and a back casing 120, and there is an opening 112 in a front face of the front casing 110. The LCD display screen 103 is configured in the housing 101 and exposed from the opening 112. The circuit board 105 is configured in the housing 101 and mounted on the back casing 120, and a power contact 151 is located on a lowest portion of the printed circuit board 105. In a front-back direction, a portion of the printed circuit board 105 which is above a topside of a position occupied by the power contact 151 overlaps with a corresponding portion of the LCD display screen 103.

Although in the present embodiment, as shown in the FIGS. 8 and 11, the printed circuit board 105 is located at a left lower corner of the mobile LCD monitor 100 and partly overlaps with the LCD display screen 103, the position of the printed circuit board 105 is not limited thereto. The circuit board 105 may be located at any positions in the mobile LCD monitor 100, for example, the circuit board 105 may be located at a left upper corner, a right lower corner, a right upper corner and the like of the LCD monitor 100, as long as the portion of the printed circuit board 105 which is above the topside of the position occupied by the power contact 151 overlaps with the corresponding portion of the LCD display screen 103.

With the above configuration, the widths of the rim parts of the front casing 110 can be reduced effectively. Therefore, it is possible to decrease widths of the four rims of the front casing 110 without changing the size of the housing 101 of the mobile LCD monitor 100, so as to properly increase the size of the LCD display screen 103 provided in the housing 101.

As shown in the FIGS. 3 to 8, the back casing 120 of the mobile LCD monitor 100 is box shape with one side opened, and comprises an upper side face portion 121, a lower side face portion 122, a left side face portion 124, a right side face portion 123 and a back face portion 125 which are integrated. The upper side face portion 121, the lower side face portion 122, the left side face portion 124 and the right side face portion 123 are arc face portions, and the back face portion 125 is a plane portion. Radiuses of curvature of the arc faces of the upper side face portion 121, the left side face portion 124 and the right side face portion 123 are the same and are larger than a radius of curvature of the arc face of the lower side face portion 122.

With the above configuration, the thicknesses of an upper side portion, a left side portion and a right side portion of the mobile LCD monitor 100 can be reduced, so that the whole weight of the mobile LCD monitor 100 becomes lighter and the manufacture cost of the mobile LCD monitor 100 is reduced. In the meantime, the mobile LCD monitor 100 has a fine appearance and a good feel.

Further, as shown in the FIGS. 1, 2 and 9, there is a power button 111 on the front casing 110 of the mobile LCD monitor 100. The power button 111 corresponds to the power contact 151 on the printed circuit board 105, and is used to switch on or switch off the mobile LCD monitor 100. For example, in the present embodiment, the power button 111 is located at a left side of a lower rim part of the front casing 110.

Since the power button 111 needs to be pressed frequently so as to switch on or switch off the mobile LCD monitor 100 when a user uses the mobile LCD monitor 100, the printed circuit board 105 at the power contact 151 which corresponds to the power button 111 is damaged easily by suffering a force. Therefore, as shown in the FIGS. 9 and 12, a first protrusion portion 127 that protrudes from an inner side face of the back casing 120 is provide on the back casing 120 on which the circuit board 105 is mounted. The first protrusion portion 127 is behind the power contact 151 in the front-back direction.

With the above configuration, the first protrusion portion 127 can reinforce and protect the printed circuit board 105 where the power contact 151 locates so as to prevent the printed circuit board 105 where the power contact 151 locates from being damaged due to a force produced when the user presses the power button 111.

Further, as shown in the FIGS. 1, 3, 7, 10 and 11, the mobile LCD monitor 100 also provides with a USB interface 150 for receiving a display signal and a power from an external host apparatus (not shown) such as a desktop computer, a notebook computer, a tablet computer and the like. For example, in the present embodiment, the USB interface 150 is located at a lower part of a left side face of the housing 101 of the mobile LCD monitor 100. As shown in the FIG. 11, one end of the USB interface 150 is connected to the printed circuit board 105, and the other end of the USB interface 150 is exposed from an opening which is located at the lower part of the left side face of the housing 101 and connects the front casing 110 to the back casing 120, so as to connect to the external host apparatus such as the desktop computer, the notebook computer, the tablet computer and the like, Since the mobile LCD monitor 100 can receive the power and the display signal via the USB interface 150, the user does not need to carry special adapters and video connecting lines, so that it is very convenient for carrying.

Although the mobile LCD monitor 100 can acquire the power via the USB interface 150 completely, the mobile LCD monitor 100 also provides with a AC connector 106 for receiving a power from an external power supply (not shown) in order to provide an additional selection to the user. For example, in the present embodiment, as shown in the FIGS. 7, 8, 10 and 11, the AC connector 106 is located at a lower part of a right side face of the housing 101. One end of the AC connector is exposed from a side face opening 113 of the front casing and a side face opening 121 of the back casing which are connected with each other, so as to connect to the external power supply (not shown); and the other end of the AC connector is connected to the printed circuit board 105 via a wire 160.

In addition, as shown in the FIG. 10, the AC connector 106 and the LCD display screen 103 are configured to be side by side in the front-back direction. With such configuration, the AC connector 106 will not increase the whole thickness of the mobile LCD monitor 100.

Further, as shown in the FIGS. 7 and 8, a lock device 107 used for combining with an external lock device (not shown) is also provided in the mobile LCD monitor 100 so as to lock the mobile LCD monitor 100 within a certain area, for example, on a desk and like, thus the mobile LCD monitor 100 is prevented from being stolen. The lock device 107 is exposed from a side face opening 114 of the front casing and a side face opening 122 of the back casing which are connected with each other, and is located above the AC connector 106.

Further, as shown in the FIGS. 8 and 9, the mobile LCD monitor also comprises a middle plate 104. The middle plate 104 is configured in the housing 101 and is located between the LCD display screen 103 and the printed circuit board 105. The middle plate 104 is used to support the LCD display screen 103 to prevent the LCD display screen 103 from being damaged, and also is used to shield an electromagnetic interference and an electrostatic interference between the LCD display screen 103 and the printed circuit board 105.

Further, as shown in the FIGS. 10 and 11, the printed circuit board 105 further comprises a display unit connector 152 used for electrically connecting to the LCD display screen 103. The display unit connector 152 is located below the LCD display screen 103 in the front-back direction. The LCD display screen 103 realizes an electrical connection with the display unit connector 152 on the printed circuit board 105 via a connecting wire 130.

It needs to press the display unit connector 152 when the connecting wire 130 is connected to the display unit connector 152, so that the printed circuit board 105 at the display unit connector 152 will be caused to be damaged easily by suffering a force. Therefore, as shown in the FIG. 13, a second protrusion portion 128 that protrudes from an inner side face of the back casing 120 is provide on the back casing 120 on which the circuit board 105 is mounted. The second protrusion portion 128 is located behind the display unit connector 152 in the front-back direction.

With the above configuration, the second protrusion portion 128 can reinforce and protect the printed circuit board 105 where the display unit connector 152 locates so as to prevent the printed circuit 105 where the display unit connector 152 locates from being damaged by suffering a force produced when the LCD display screen is connected to the display unit connector 152.

Further, when the mobile LCD monitor 100 is used, the mobile LCD monitor 100 can be placed horizontally on a desk, or the mobile LCD monitor 100 can be supported on the desk by using an external support member so as to make the mobile LCD monitor 100 to form a certain angle with the desk. When the mobile LCD monitor 100 is supported on the desk by using the external support member, in order to enable the mobile LCD monitor 100 to be secured on the external support member firmly and not fall from the external support member, as shown in the FIG. 2, a joint member 126 is provided on an external side face of the back casing 120 of the mobile LCD monitor 100 and is used for securing the mobile LCD monitor 100 on the external support member. The joint member 126 can be a Velcro tape when the external support member is a leather support member.

In order to protect the mobile LCD monitor 100, a leather protective cover can be provided. When the mobile LCD monitor 100 is in an unused state, the protective cover can enwrap the mobile LCD monitor 100 to protect the mobile LCD monitor 100, so as to prevent the LCD display screen 103 and the housing 101 of the mobile LCD monitor 100 from being scratched by an external sharp utensil, and can serve a buffering protection function for the mobile LCD monitor 100 when the mobile LCD monitor 100 is fallen incautiously. When the mobile LCD monitor 100 is in a used state, the protective cover can serve as the external support member by folding, so as to support the mobile LCD monitor 100.

Figure 14:
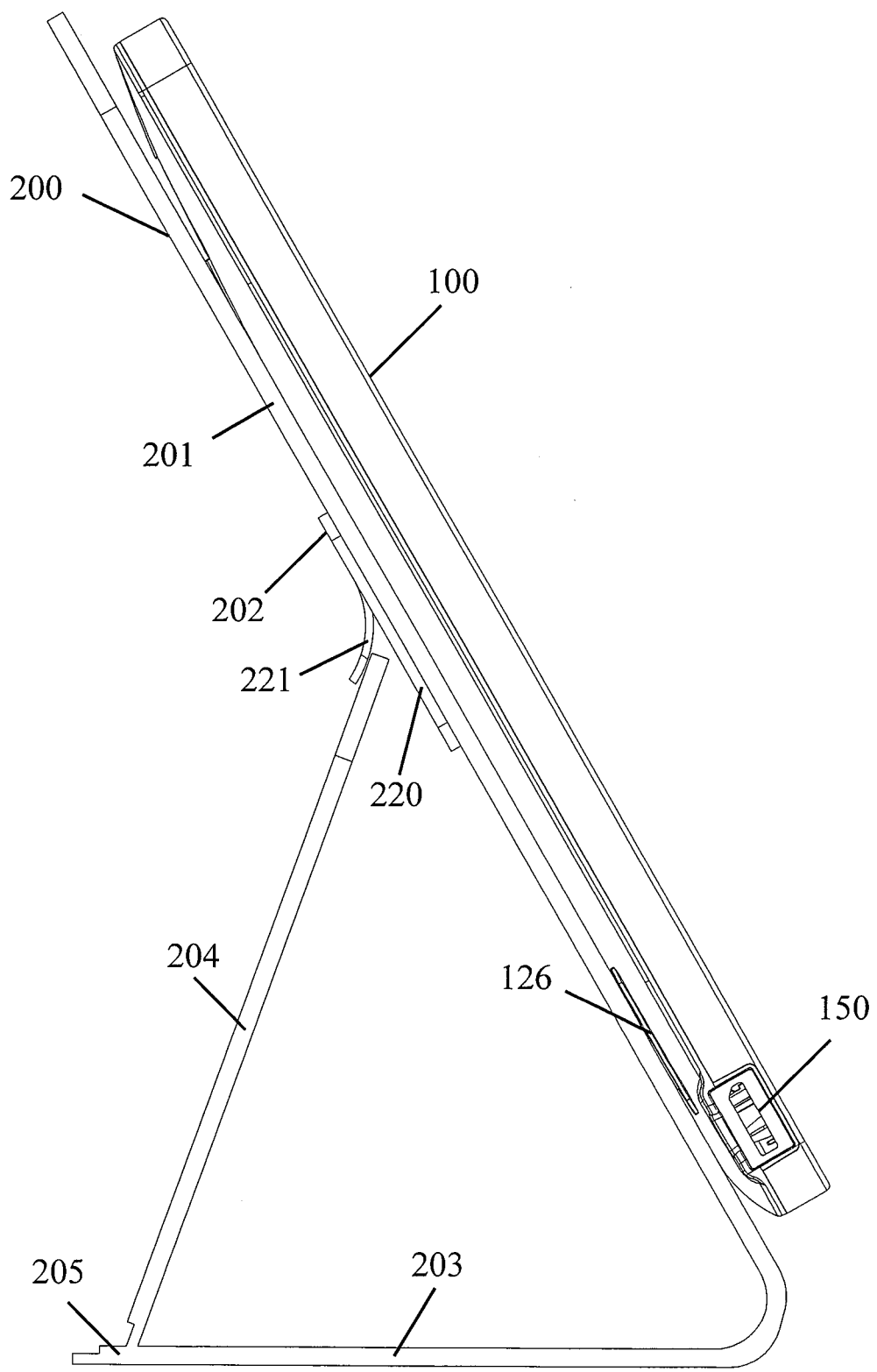
FIG. 14 shows an exemplary schematic diagram that a protective cover functioned as an external support member supports the mobile LCD monitor according to the embodiment.

FIG. 14 shows a schematic diagram that a protective cover 200 functioned as the external support member supports the mobile LCD monitor 100 according to the embodiment. As shown in the FIG. 14, the protective cover 200 can be a leather protective cover, and comprises a first front plate 204, a second front plate 203 and a back plate 201 which are connected in turn. It is foldable between the first front plate 204 and the second front plate 203. It is foldable between the second front plate 203 and the back plate 201. The mobile LCD monitor 100 is secured on an inside face of the back plate 201 of the protective cover 200 by providing the joint member 126 such as a Velcro tape on the back casing 120. When the mobile LCD monitor 100 is in the unused state, the first front plate 204 and the second front plate 203 of the protective cover 200 cover the front of the mobile LCD monitor 100 including the LCD display screen 103 so as to prevent the LCD display screen 103 of the mobile LCD monitor 100 from being scratched by the external sharp utensil. In addition, as shown in the FIG. 14, when the mobile LCD monitor 100 is in the used state, the first front plate 204 and the second front plate 203 are folded backward and are combined with the back plate 201 via a fixation member 202 provided on an outside face of the back plate 201 to form the external support member. The fixation member 202 comprises a base portion 220 and a movable portion 210. The base portion 220 is fixed on the outside face of the back plate 201. One end of the movable portion 210 integrates with the base portion 220 and is fixed on the outside face of the back plate 201, and the other end of the movable portion 210 can move a certain angle with respect to the base portion 220. The second front plate 203 of the protective cover 200 serves as a support plate after being folded backward with respect to the back plate 201 to contact with a placing surface such as a desktop and the like, and then, the first front plate 204 of the protective cover 200 is folded backward again, and one end of the protective cover 200 which is not connected to the second front plate 203 is sandwiched between the base portion 220 and the movable portion 210 of the fixation member 202, so as to form a steady external support member.

Figure 15:
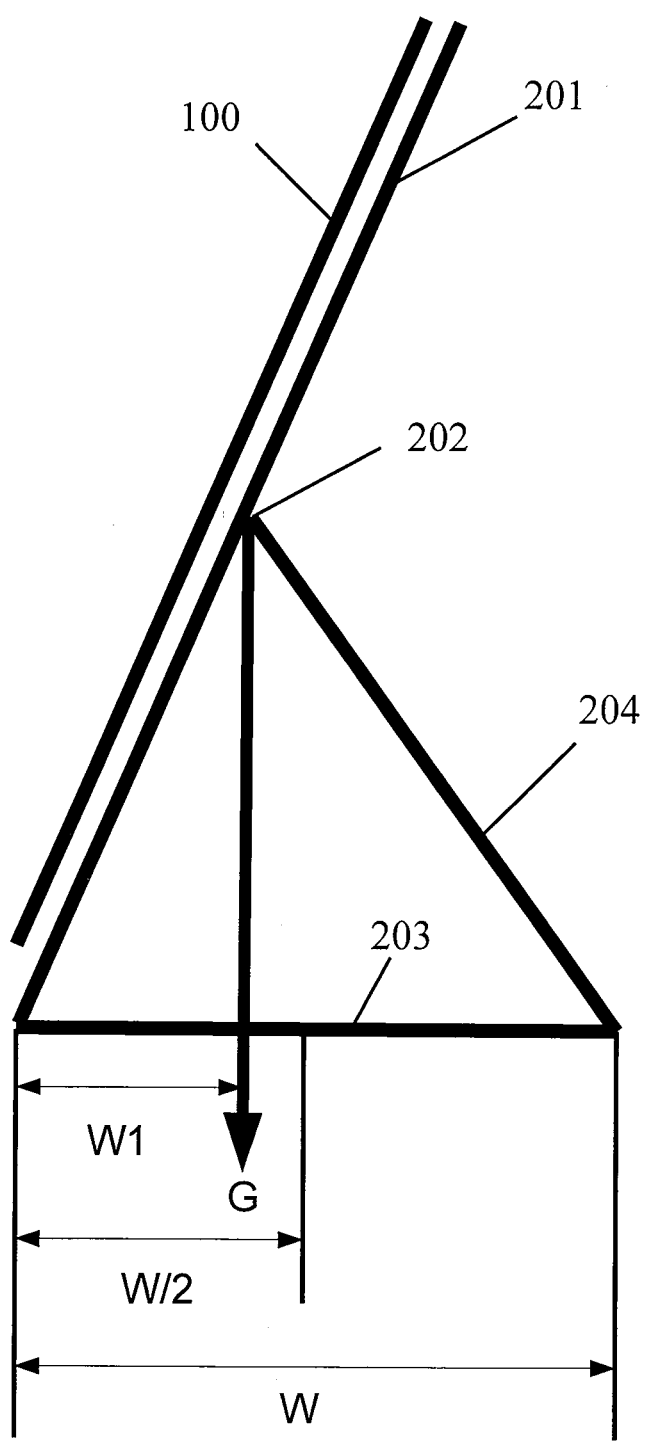
FIG. 15 shows an exemplary schematic diagram illustrating a footprint of a protective cover functioned as an external support member when it supports the mobile LCD monitor.

FIG. 15 shows a schematic diagram illustrating the steadiness and the footprint of the protective cover 200 functioned as the external support member when it supports the mobile LCD monitor 100. As shown in the FIG. 15, when the protective cover 200 functioned as the external support member is placed on the placing surface such as the desktop and the like to support the mobile LCD monitor 100, in order to make the protective cover 200 not only to be capable of steadily supporting the mobile LCD monitor 100, but also to be capable of minimizing the footprint of the protective cover 200 on the placing surface (that is, the footprint of the second front plate 203), the protective cover 200 is designed such that the fixation member 202 is located at a substantial center of the back plate 201. A vertical distance W1 from a point that a center of gravity of the mobile LCD monitor 100 and the back plate 201 as a whole projects on the second front plate 203 to a connecting line of the second front plate 203 and the back plate 201 is less than a half of a width W/2 of the second front plate 203, that is, W1<W/2.

Further, as shown in the FIG. 14, a slit protective part 205 is provided at the connection between the first front plate 204 and the second front plate 203 of the protective cover 200. The slit protective part 205 is integrated with the second front plate 203 and is used to cover a slit between the first front plate 204 and the second front plate 203 due to folding when the first front plate 204 and the second front plate 203 cover the front of the mobile LCD monitor 100 including the LCD display screen 103 and the first front plate 204 is folded with respect to the second front plate 203, in order to achieve a purpose of protecting the LCD display screen 103.

Figure 16:
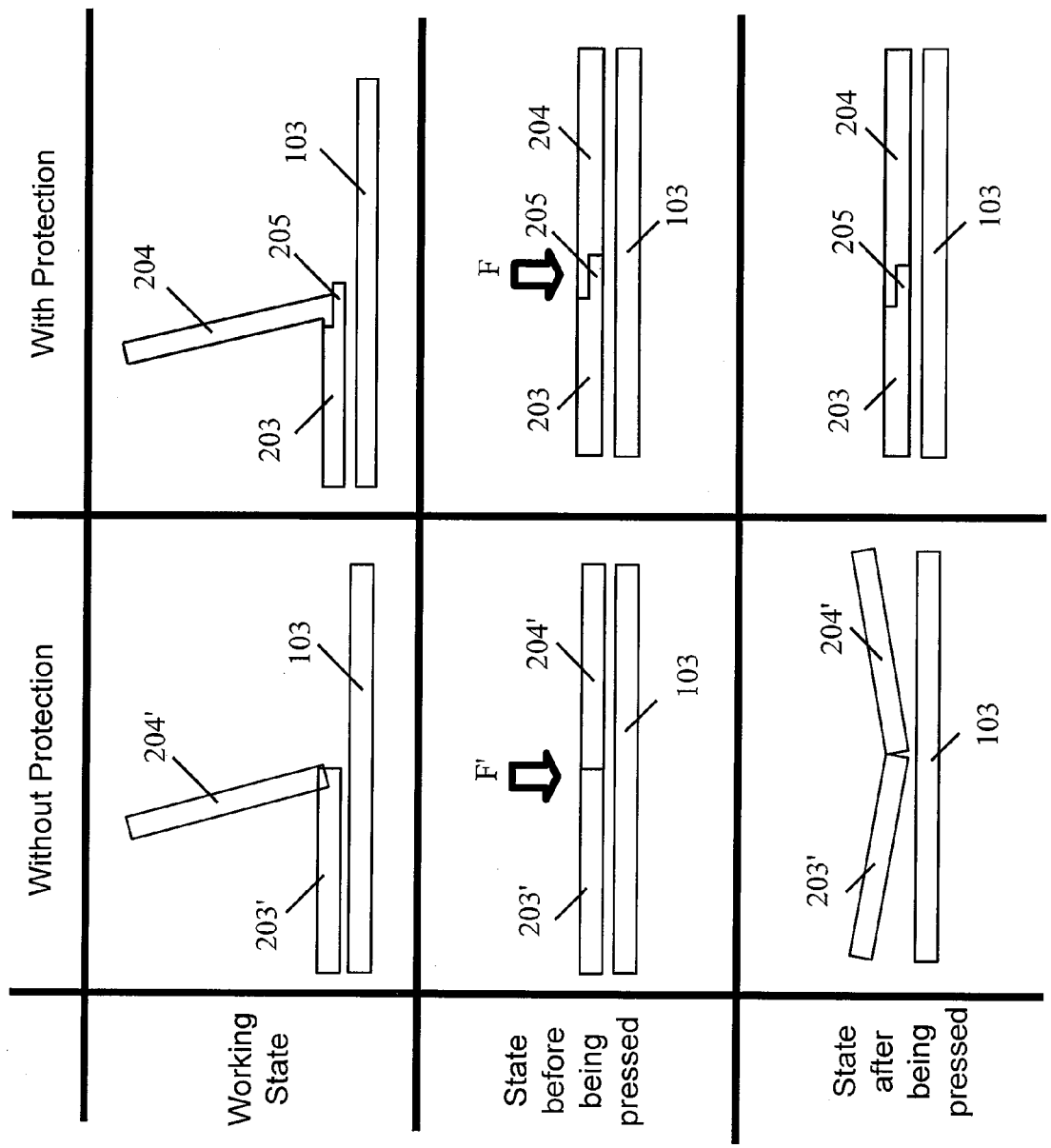
FIG. 16 shows an exemplary schematic diagram illustrating comparison results between a protective cover with a slit protective part and a protective cover without a slit protective part in a working state, in a state before being pressed, and in a state after being pressed.

FIG. 16 shows a schematic diagram illustrating comparison results between a protective cover with a slit protective part and a protective cover without a slit protective part in a working state, in a state before being pressed, and in a state after being pressed.

As for the protective cover without the slit protective part, as shown in the FIG. 16, in the working state, when a user operates a first front plate 204' to be folded with respect to a second front plate 203', a slit produced between the first front plate 204' and the second front plate 203' may damage the LCD display screen 103. Further, as shown in the FIG. 16, when the first front plate 204' and the second front plate 203' cover on the LCD display screen 103 and the connection between the first front plate 204' and the second front plate 203' is suffered an outside force F', the outside force F' causes a slit to be produced between the first front plate 204' and the second front plate 203' and further damages the LCD display screen 103.

As for the protective cover 200 with the slit protective part 205, as shown in the FIG. 16, in the working state, when the user operates the first front plate 204 to be folded with respect to the second front plate 203, a slit produced between the first front plate 204 and the second front plate 203 is covered by the slit protective part 205, thus the LCD display screen 103 will not be damaged. Further, as shown in the FIG. 16, when the first front plate 204 and the second front plate 203 cover on the LCD display screen 103 and the connection between the first front plate 204 and the second front plate 203 is suffered an outside force F, the outside force F will not cause a slit to be produced between the first front plate 204 and the second front plate 203 due to the slit protective part 205, thus the LCD display screen 103 will not be damaged.

a purpose of the embodiment is to provide an electronic apparatus which is capable of decreasing widths of the four rims of the front casing by arranging the internal components of the electronic apparatus suitably without changing the size of the housing of the electronic apparatus, so as to properly increase the size of the display unit provided in the housing.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus, comprising: a housing comprising a front casing comprising an opening and a back casing; a display in the housing and exposed from the opening; and a printed circuit board in the housing and on the back casing comprising a power contact on a lowest portion of the printed circuit board, wherein, a portion of the printed circuit board above the power contact overlaps a corresponding portion of the display in a front-back direction, wherein the back casing comprises a first protrusion portion that protrudes from an inner side face of the back casing, and the first protrusion portion is located behind the power contact in the front-back direction' wherein the printed circuit board further comprises a display connector used for connecting to the display; the back casing comprises a second protrusion portion that protrudes from an inner side face of the back casing, and the second protrusion portion is located behind the display in the front-back direction.

2. The electronic apparatus of claim 1, wherein the back casing comprises a box shape opening in one side, an upper side face portion, a lower side face portion, a left side face portion, a right side face portion and a back face portion, and where in the upper side face portion, the lower side face portion, the left side face portion and the right side face portion are arc face portions, the back face portion is a plane face portion, and radiuses of curvature of arc faces of the upper side face portion, the left side face portion and the right side face portion are same and are larger than radius of curvature of arc face of the lower side face portion.

3. The electronic apparatus of claim 2, further comprising a joint member on an external side face of the back casing and used for securing the electronic apparatus to an external support member.

4. The electronic apparatus of claim 3, further comprising a middle plate in the housing and located between the display and the printed circuit board.

5. The electronic apparatus of claim 4, wherein the electronic apparatus is a mobile LCD monitor.

6. The electronic apparatus of claim 2, further comprising a middle plate in the housing and located between the display and the printed circuit board.

7. The electronic apparatus of claim 6, wherein the electronic apparatus is a mobile LCD monitor.

8. The electronic apparatus of claim 1, further comprising an AC connector comprising one end at a side face of the housing and used for connecting to an external power supply, and the other end connecting to the printed circuit board, wherein the AC connector and the display are configured to be side by side viewed from the front-back direction.

9. The electronic apparatus of claim 8, further comprising a middle plate in the housing and located between the display and the printed circuit board.

10. The electronic apparatus of claim 9, wherein the electronic apparatus is a mobile LCD monitor.

11. The electronic apparatus of claim 1, further comprising a middle plate in the housing and located between the display and the printed circuit board.

12. The electronic apparatus of claim 11, wherein the electronic apparatus is a mobile LCD monitor.

13. The electronic apparatus of claim 1, further comprising a middle plate in the housing and located between the display and the printed circuit board.

14. The electronic apparatus of claim 13, wherein the electronic apparatus is a mobile LCD monitor.

15. The electronic apparatus of claim 1, further comprising a middle plate in the housing and located between the display and the printed circuit board.

16. The electronic apparatus of claim 15, wherein the electronic apparatus is a mobile LCD monitor.

\* \* \* \* \*